March 7, 1950  E. R. POULTON  2,500,137
ANGLE MEASURING INSTRUMENT
Filed Nov. 13, 1945  2 Sheets-Sheet 1
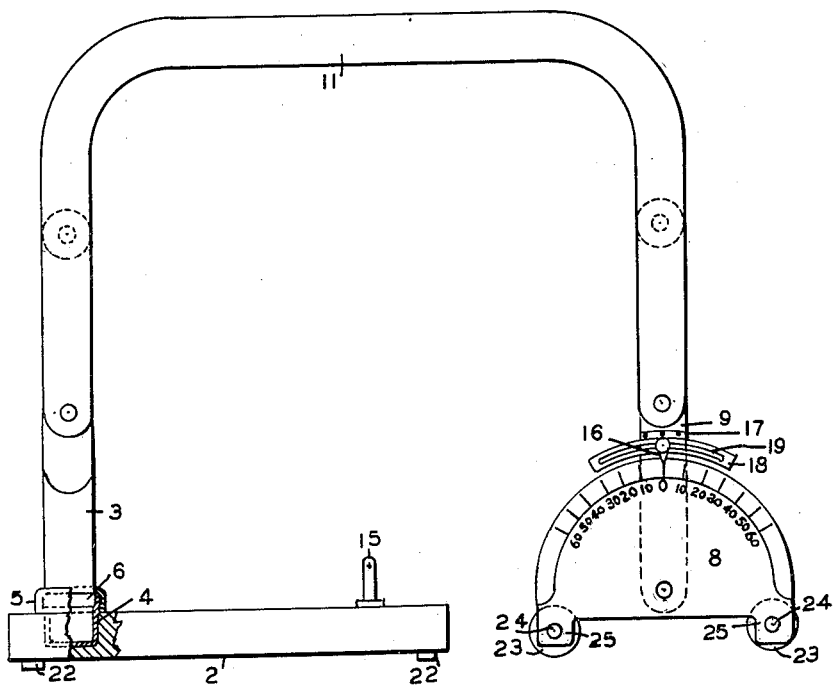
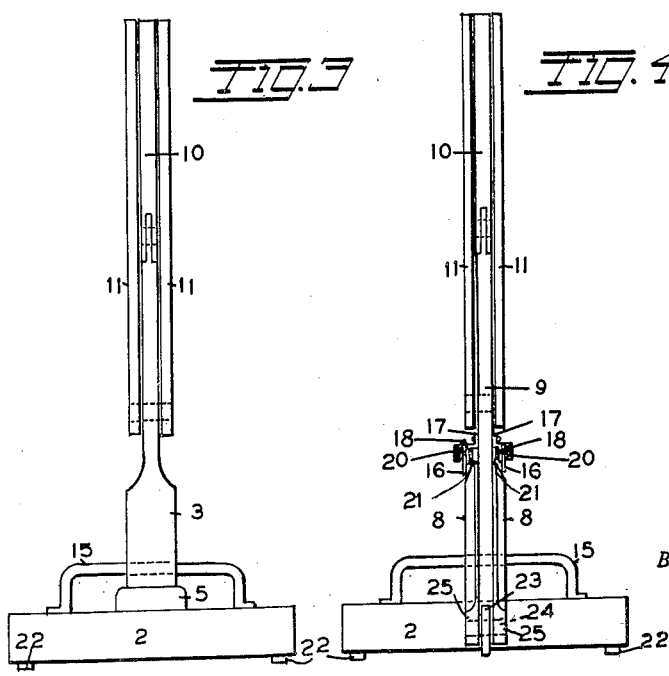
INVENTOR.
ERNEST R. POULTON
BY Edward M. Fisher Patented Mar. 7, 1950

2,500,137

UNITED STATES PATENT OFFICE 2,500,137

ANGLE MEASURING INSTRUMENT

Ernest R. Poulton, Orlando, Fla., assignor to Wilma Poulton, Orlando, Fla.

Application November 13, 1945, Serial No. 628,113

1 Claim. (Cl. 33—174)

This invention is concerned with the provision of an instrument by means of which movements of all pivoted aircraft control surfaces such as rudder, ailerons, elevators, and the like, may be measured (as to a specified neutral position).

Broadly it is an object of this invention to provide an instrument of the type which consists generally of a base having a handle which may be grasped to hold the instrument base member upon a fixed surface, an arm supporting a dial pointer and a dial pivoted at the base thereof, and link members having pivotal relation thru their respective opposite ends with a base standard and a dial pointer supporting arm respectively and in a manner providing aligned parallel attitude between said base standard and dial pointer supporting arm for accurately indicating by the dial pointer at all times upon the dial, the measurement of movement of pivoted control surface, such as rudder, aileron, elevator and the like, to its specified neutral position.

This invention resides substantially in the combination, construction, and arrangement and relative location of parts, all in accordance with the disclosure herein.

In the accompanying drawings,

Figure 1 is a side elevation of an instrument embodying this invention, illustrating same in a horizontal plane and swiveled on the base for a short measurement.

Figures 3 and 4 are respective end views of the instrument as positioned in Figure 1.

Figure 2:
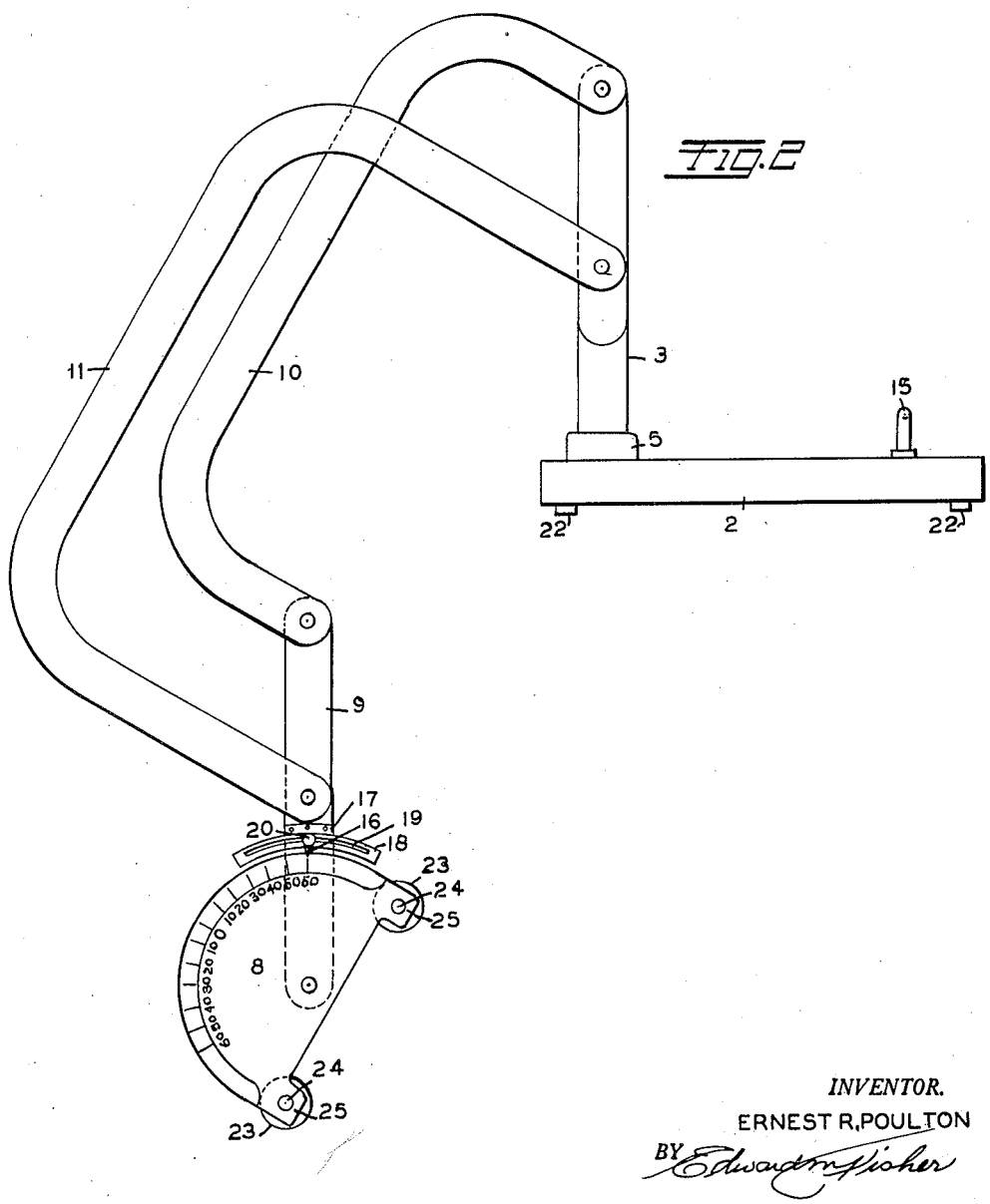
Figure 2 illustrates the side opposite to that of Figure 1 and showing the instrument in position as when measuring an angular movement and swiveled on the base for an extended measurement.

The true nature and manner of use of an instrument in accordance with this invention will be best understood by a detailed description of the form thereof shown in the drawings in an illustrative sense.

This instrument includes a base 2 which is preferably, as shown, of oblong shape. Extending at right angle to one face thereof and towards one end is the base standard 3 lower portion being circular and in swivel engagement with the base 2 thru a socket 4, which is permanently set in the base, having a screw cap 5 adapted to encompass a collar 6 formed on said standard and be screwed upon socket 4 to clamp the standard to the base when the instrument has been set in the desired position, upper portion of said standard having flat side faces. Further included in said invention are dial members 8 having suitable graduation indicating angular degrees, and which are oppositely disposed and freely pivoted upon a supporting arm 9.

In order to accurately indicate at all times upon the dials the measurement of movement of a pivoted control surface, such as rudder, aileron, elevator, and the like, to the specified neutral position thereof as to the plane of the base an aligned parallel attitude must be maintained between the standard 3 and supporting arm 9. Therefore, I provide a framework consisting of a link member 10, which is bifurcated at its opposite ends to fit over and be pivotally connected with outer ends of the standard 3 and the supporting arm 9 respectively, and link members 11 which have the same effective overall length as link member 10 and which, at their respective ends are pivotally connected with members 3 and 9 substantially midway thereof.

As illustrated in the drawings link members 10 and 11 are arch formed. This is to permit measuring of centrally pivoted control surfaces, known in the art as balanced controls, such as are generally found in rudder structures of large aircraft, and wherein, in measuring the downward movement, clearance has to be provided for the upswing of the balance portion of the control surface, or vice versa. It is however obvious that this structure should not be considered as a limitation to the structure of this invention as the true spirit of same will still exist in an instrument having straight links and be useful in the measuring of many control surfaces, excepting ones having the above described quality.

In the use of an instrument of this kind the control surface of aircraft is first placed in a specified neutral position to the fixed surface, the base member 2 is then placed on the fixed surface, and be manually held there by means of handle 15, the dial members 8 being placed on control surface. However the specified neutral position of the control surface is not always in a true parallel or perpendicular position relative to the fixed surface, and since it is the object of this instrument to measure the angular movement of a control surface to its specified neutral position it is necessary to adjust the dial pointer 16 to the existing common attitude of the control surface to the fixed surface which means an adjustment of the dial pointer 16 to the common point on the dial —0— on the dial 8. As illustrated in the drawings there are dual dials oppositely disposed and freely pivoted upon the supporting arm 9, this allows for both right and left hand use of the instrument, and for free rotation of the dials with movement of a control member.

Above each dial and in fixed engagement with the arm 9 are dial pointer supporting brackets 17 outer flange 18 thereof having a slot 19, curved in conformity to the curvature of the dial 8, and within which an adjusting screw 20, having mounted thereon the dial pointer 16, is free to move for adjustment of the dial pointer as above outlined and when adjustment is completed the dial pointer is locked in position by setting of said screw in the nut 21.

To compensate for airfoil curvature, rivet heads, overlaps and the like and to prevent slippage of the base 2 I provide pads 22 at each corner of the underside of said base, and to readily fit the dial member 8 to the control surfaces over curvatures and the like I provide rollers 23 rotatable upon axles 24 which terminate in opposite footings 25 of the dials 8.

While the preferred specific embodiment of the invention are hereinbefore set forth, it is to be understood that I am not to be limited to the exact structure illustrated and described, as various modifications of these details may be provided in putting the invention into practice, within the purview of the appended claim.

What is claimed is:

An instrument of the kind described, comprising a portable base, a dial arranged at right angles to the plane of the base and having an angular scale markings visible thereon, a supporting member having one end pivoted to the dial centrally with respect to the scale markings, a pointer bracket carried by the member next to the dial, a pointer fitted to the bracket and coacting with the markings, a support on the base and turnable thereon, upwardly arched links having equal effective lengths pivoted to the support and supporting member, respectively, with the pivots of one link spaced from the pivots of the other, and contact rollers carried by the dial.

ERNEST R. POULTON.

REFERENCES CITED

The following references are of record in the file of this patent:

UNITED STATES PATENTS

| Number | Name | Date |
|---|---|---|
| 374,955 | Gay | Dec. 20, 1887 |
| 955,347 | Nevanas | Apr. 19, 1910 |
| 1,161,625 | Davidson et al. | Nov. 23, 1915 |
| 1,363,866 | Hanks | Dec. 28, 1920 |
| 1,597,357 | Godfrey | Aug. 24, 1926 |
| 1,828,930 | Grozic | Oct. 27, 1931 |
| 2,172,368 | Eby | Sept. 12, 1939 |
| 2,332,860 | Langsner | Oct. 26, 1943 |